United States Patent
Sheldon et al.

[11] Patent Number: 5,203,886
[45] Date of Patent: Apr. 20, 1993

[54] HIGH POROSITY VITRIFIED BONDED GRINDING WHEELS

[75] Inventors: David A. Sheldon, Worcester; Carole J. Markhoff-Matheny, Leicester; Renato Terragni, Holden, all of Mass.

[73] Assignee: Norton Company, Worcester, Mass.

[21] Appl. No.: 743,952

[22] Filed: Aug. 12, 1991

[51] Int. Cl.$^5$ ................................. B24D 3/02
[52] U.S. Cl. .......................... 51/309; 51/298; 51/307; 51/308
[58] Field of Search ................ 51/298, 307, 308, 309

[56] References Cited

U.S. PATENT DOCUMENTS

| | | | |
|---|---|---|---|
| 2,085,137 | 6/1935 | Wooddell et al. | 51/278 |
| 2,806,772 | 9/1957 | Robie | 51/296 |
| 2,986,455 | 5/1961 | Sandmeyer | 51/309 |
| 3,329,488 | 7/1967 | Cofran | 51/296 |
| 4,314,827 | 2/1982 | Leitheiser et al. | 51/298 |
| 4,518,397 | 5/1985 | Leitheiser et al. | 51/293 |
| 4,623,364 | 11/1986 | Cottringer et al. | 51/309 |
| 4,744,802 | 5/1988 | Schwabel | 51/309 |
| 4,883,501 | 11/1989 | Haynes, Jr. | 51/309 |
| 4,954,462 | 9/1990 | Wood et al. | 501/95 |
| 4,964,883 | 10/1990 | Morris et al. | 51/293 |
| 4,988,370 | 1/1991 | Haynes, Jr. | 51/309 |
| 5,035,723 | 7/1991 | Kalinowski et al. | 51/307 |
| 5,035,724 | 7/1991 | Pukari et al. | 51/309 |
| 5,037,452 | 8/1991 | Gary et al. | 51/309 |
| 5,037,453 | 8/1991 | Narayanan et al. | 51/309 |
| 5,094,672 | 3/1992 | Giles, Jr. et al. | 51/309 |

FOREIGN PATENT DOCUMENTS

WO9002160 8/1989 European Pat. Off.
WO9008744 2/1990 European Pat. Off.

*Primary Examiner*—William R. Dixon, Jr.
*Assistant Examiner*—Willie J. Thompson
*Attorney, Agent, or Firm*—David Bennett

[57] ABSTRACT

Vitrified bonded abrasive bodies prepared from sol-gel sintered aluminous grit particles, a vitreous bond, bubbled alumina, and a sacrificial organic material exhibit improved abrasive performance, especially for creep-feed grinding products.

16 Claims, 1 Drawing Sheet

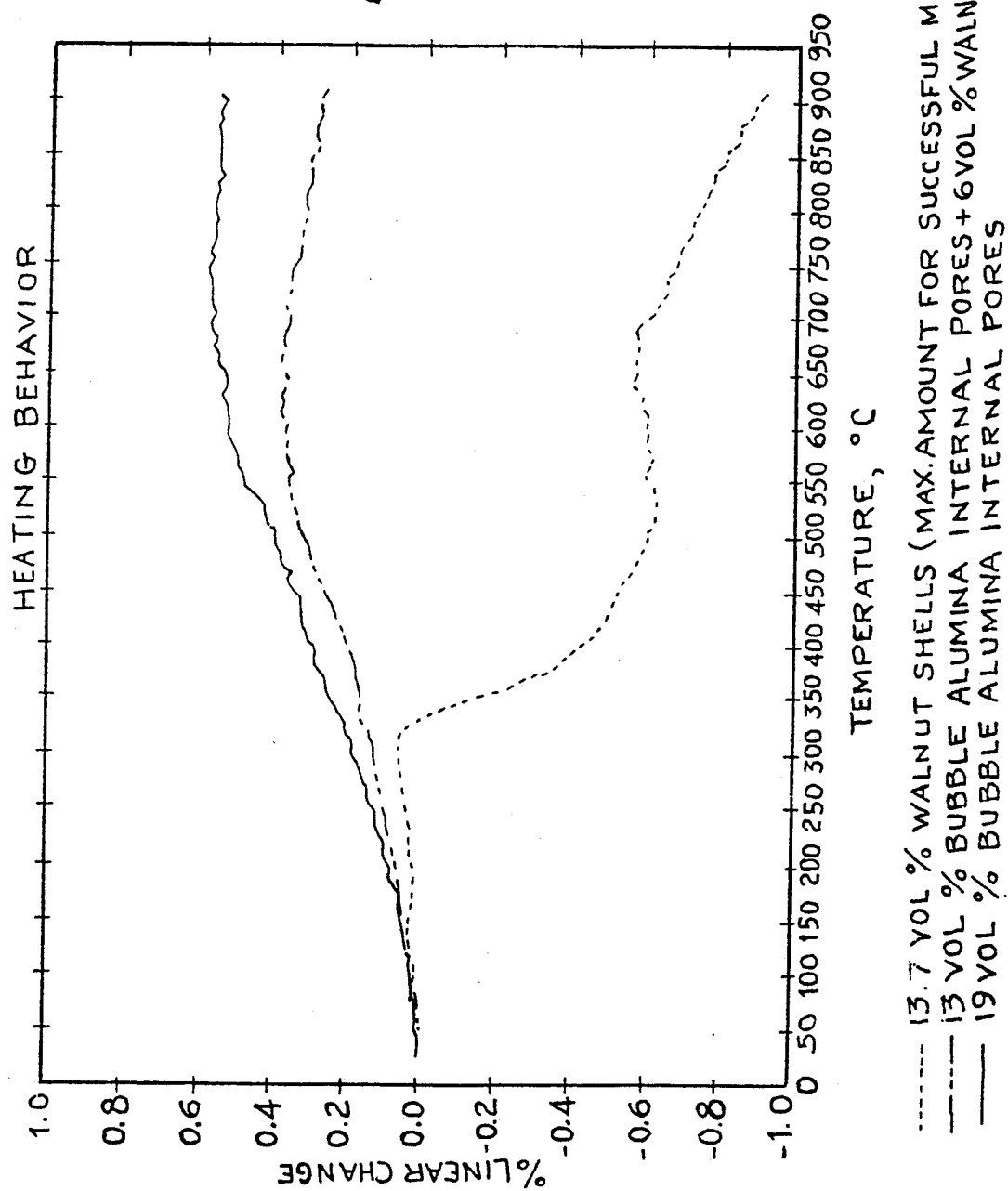

HIGH POROSITY VITRIFIED BONDED GRINDING WHEELS

TECHNICAL FIELD

The invention relates to high structure, i.e. high porosity vitrified (glass) bonded sol-gel sintered aluminous abrasive bodies, e.g. creepfeed grinding wheels and the like, which are prepared from particles of sol-gel sintered aluminous material. The bodies are prepared by mixing the sol-gel particles with a vitrified bond composition and a pore inducing material, forming the mixture into the desired shape, and then firing the shaped body. Optionally a portion of the sol-gel particles may be replaced by a second abrasive material such as fused white alumina particles.

Problems have been encountered with the "makeability" of certain sol-gel aluminous abrasive wheels with high structures. The "makeability" is the ease with which the formulations can be formed and fired into wheels. Wheels with poor makeability tend to slump during firing if the pore former is lost before the structure has acquired sufficient inherent strength to resist collapsing to the natural packing density of the mixture without the pore former. It will readily be apparent therefore that this is a problem with vitreous bonded structures with a high structure containing relatively large amounts of an organic pore former. Alternative pore formers that are not lost during firing tend to have good makeability but yield products with inferior grinding performance. This is because the porosity they induce is a closed porosity that is less capable of carrying out certain of the functions of a pore former.

BACKGROUND OF THE INVENTION

The present invention is particularly directed to vitrified bonded grinding products, e.g. wheels and the like, which are prepared from sol-gel aluminous abrasive grit, a vitreous bond, and a combination of porosity resulting agents which are superior to either alone.

Attempts at generating the requisite total porosity and types of porosity to produce improved vitrified bonded grinding products, especially creepfeed wheels, from sol-gel sintered alumina abrasive grits, especially those having an average particle size greater than about 65 microns, have not been completely successful. There is thus a desire to produce creep-feed and other grinding products containing sol-gel grits in vitrified bonds, which products have an appropriate balance of types of porosity to obtain wheels exhibiting improved grinding performance and excellent makeability.

Sol-gel abrasives are generally made by forming a hydrated alumina gel which may also contain varying amounts of additives such as MgO or $ZrO_2$ and then drying and sintering the gel. See for example, U.S. Pat. No. 4,314,827. Seeded sol-el abrasives such as those formed by the conversion of hydrated alumina to alpha alumina by the use of alpha alumina seed or functional equivalent materials having the same crystal structure and similar lattice parameters, such as ferric oxide and the like. Processes for the production of seeded sol-gel alumina materials are described, for example, in U.S. Pat. Nos. 4,623,364, 4,744,802, 4,954,462, 4,964,883, and PCT Applications WO 90/08744 and WO 90/02160. Other sol-gel techniques which accomplish a similar result may be used.

To produce abrasive material from a gel, a dried extruded gel material is usually crushed or broken by suitable means such as a hammer or ball mill to form abrasive particles which are generally then size classified. The same type of extrusion, grinding, and forming processes may be used with other abrasive forming compositions than sol-gel materials.

For purposes of this application and the invention disclosed, the term "sol-gel sintered alumina abrasive" is intended to apply to abrasives produced by the teachings of any of U.S. Pat. Nos. 4,518,397, 4,623,364, 4,744,802, 4,954,462, 4,964,883, and PCT Applications WO 90/08744 and WO 90/02160 as well as other sol-gel techniques useful in the art.

Previous attempts at providing porosity in conventional fused white alumina based grinding products include such as:

U.S. Pat. No. 2,085,137 discloses the preparation of abrasive articles by incorporating coke or charcoal in a vitreous bond composition of relatively large abrasive grains, i.e. 40 to 150 grit, to form cellular abrasive structures.

U.S. Pat. No. 2,806,772 discloses in non-vitreous bonded abrasives which are processed at very low temperatures, i.e. below about 260° C., the use of small thin walled balloons of vitrified clay or of heat hardened organic resins to generate porosity in fused alumina abrasive bodies.

U.S. Pat. No. 2,986,455 discloses generally resinoid bonded abrasive bodies containing alumina bubbles in particle sizes as coarse as 6 mesh and finer.

U.S. Pat. No. 3,329,488 discloses organic (resin) bonded abrasive articles containing olivine, a friable pore-forming material which is a mineral of silicates of magnesium and ferrous iron.

Cincinnati Milicron Corp. prepared, at least in 1985, a vitrified bonded grinding wheel which, by examination was found to contain about 86 wt % conventional white fused alumina, about 4.5 wt % bubbled alumina generally having a size greater than about 227 microns, and about 9.5 wt % of a vitrified bond. Microscopic examination also indicated that the product contained some macropores that were believed to have been produced using a conventional pore inducing media that decomposed upon heat treatment, i.e. in drying and/or firing. No sol-gel aluminous grits were found in the product.

When sol-gel alumina vitrified bonded grinding wheels are prepared in accordance with this invention, i.e. containing a combination of both a bubbled alumina and an organic pore inducing material, the resultant wheel is improved substantially over wheels prepared with either material alone and may be operated at higher unit pressure. This results in an improved abrasive grain and overall grinding performance.

Accordingly, it is an object of this invention to produce an improved grinding product from a vitrified bonded sol- gel aluminous grit.

It is a still further object to produce an improved creepfeed grinding wheel.

These and still further objects will be apparent from the following disclosure of the preferred embodiments.

SUMMARY OF THE INVENTION

It has now been found that by incorporating a combination of bubbled alumina beads and particles of an organic pore inducing material along with aluminous sol-gel abrasive particles the resulting formulation has excellent makeability. Moreover an improved vitreous-bonded abrasive article can be prepared having a particularly suitable total amount and balance of types of porosity, i.e. both closed pores derived from the bubbled alumina and open pores derived from the organic pore inducing material which decomposes during the firing. Such products exhibit superior performance in wet grinding uses and extended life in dry grinding uses.

It has been found that the use of this combination of bubbled alumina and an organic pore inducing material (which will decompose to form pores during firing) with aluminous sol-gel abrasive grit particles and a vitreous bond composition and then processing the complete composition into a vitrified-bonded body by firing at elevated temperature, generally below about 1000° C., produces improved grinding products. The products may be operated at higher unit pressures than previously believed suitable for extended operation of such products.

BRIEF DESCRIPTION OF THE DRAWINGS

FIG. 1 shows the heating behavior (thermal expansion) of the grinding wheel of Example I and the comparable materials of Comparative Example A prepared with the HA4C vitreous bond.

DETAILED DESCRIPTION OF THE INVENTION

The vitrified bonded abrasive bodies of the present invention are prepared from a mixture comprising sol-gel aluminous grits, a vitreous bond, bubbled alumina, and an organic pore inducing material.

The aluminous grits are prepared by a sol-gel technique which entails crushing and firing a dried gel prepared from a hydrated alumina such as microcrystalline boehmite, water, and an acid such as nitric acid. The initial sol may further include up to about 10–15 weight % of spinel, mullite, manganese dioxide, titania, magnesia, ceria, zirconia powder or a zirconia precursor which can be added in larger amounts, e.g. 40% or more, or other compatible additives or precursors thereof. The additives are normally included to modify such properties as fracture toughness, hardness, friability, fracture mechanics, or drying behavior. In its most preferred embodiment, the sol or gel includes a dispersed submicron crystalline seed material or a precursor thereof in an amount effective to facilitate the conversion of the hydrated alumina particles to alpha alumina upon sintering. Suitable such seeds are well known to the art. The amount of seed material should generally not exceed about 10 weight % of the hydrated alumina and there is normally no benefit to amounts in excess of about 5%. If the seed is adequately fine (preferably about 60 m² per gram or more), amounts of from about 0.5 to 10% may be used with about 1 to 5% being preferred. The seeds may also be added in the form of a precursor such as ferric nitrate solution. The preparation of suitable gels, both with and without seeds, is well known in the art, as are the crushing and firing procedures. Further details thereon are readily available in the literature and thus not included here.

Each aluminous grit so prepared is made up essentially of numerous non-cellular alpha alumina crystals having a crystal size of less than about 10 microns, preferably less than about 1 micron. The abrasive has a density of at least about 95% of theoretical density.

Suitable sol-gel aluminous grits have an average particle size ranging from as small as about 65 microns to as large as more than about 1,000 microns, as determined by Coulter Counter. Preferably the average particle size is from about 120 to 500 microns. More preferably the average particle size is from about 140 to 300 microns.

The abrasive products of this invention are bonded with a vitrified bond. Any conventional vitreous bond composition may be used in the present invention. To form the bond, the vitreous composition is fired at an elevated temperature suitable for the particular bond composition. Generally the temperature will be greater than about 600° C. and below about 1050° C., preferably in the range of from about 800 to about 1000° C. Suitable vitreous bond compositions are commercially available from O. Hommel Company of Pittsburg, Pa., Etes L'Hospied of Valluria, France, Ferro Corp. of Cleveland, Ohio, and others. The amount of bond used for a particular product will vary based upon its intended use. Generally, however, about 4 to 20, preferably about 5–15, vol % bond will be used. Depending upon the actual density of each of the materials used to form the grinding products, this will correspond to about 5 to 35 wt % of the mix from which the product is formed and fired. The bond may include up to about 50% by volume fillers or grinding aids, as well known in the art. Vitrified bonds, while amenable to the incorporation of fillers, somewhat limit the useful materials because of the high temperatures required to mature such bonds. Thus suitable fillers include such materials as kyanite, mullite, and molybdenum disulfide, depending upon the maturing temperature of a particular vitrified bond.

Bond A is a raw bond the formulation of which is described in Table 1 of U.S. Pat. No. 5,035,723. Bond B is a fritted bond (used in the examples below) for which the unfired and fired compositions are the same. The fired compositions of these bonds are:

TABLE I

| Fused Oxide Composition of Bonds, % by weight | | |
|---|---|---|
| | Bond A | Bond B |
| $SiO_2$ | 46.3 | 56.6 |
| $B_2O_3$ | 18.6 | 26.1 |
| $Al_2O^3$ | 17.8 | 7.5 |
| CaO | 1.5 | 2.2 |
| $Na_2O$ | 9.4 | 5.3 |
| $K_2O$ | 2.9 | 0.1 |
| $Li_2O$ | 1.8 | — |
| CoO | 1.0 | 1.2 |
| $Fe_2O_3$, TiO, MgO | 0.7 | 1.0 |
| Total | 100.0 | 100.0 |

Bubbled alumina is a weak thin walled hollow sphere of alumina having an average diameter generally less than about 3 mm. The wall thickness is usually on the order of 100 microns. Such materials are commercially available from Herman C. Stark GmbH of Germany. The size of the alumina bubbles which are used will preferably vary based upon the coarseness of the aluminous grit used for the body. Thus, when the grit has an average particle size of about 750 microns or greater, bubbles about 1–2 mm are preferred; when the grit is about 250 to 750 microns, bubbles about 0.5–1 mm are preferred; and when the grit is finer than about 250 microns, bubbles of less than about 0.5 mm are preferred. The amount of bubbled alumina is generally on the order of about 5 to 30 vol %, preferably about 7 to 25 vol %, and most preferably about 10 to 20 vol % of the grinding product. Approximately 50 to 70% of the bulk volume of the bubbled alumina is porosity in the product.

The sacrificial organic pore inducing material is an organic material which will completely decompose at a temperature which is at least about 25, preferably at least about 50, and most preferably at least about 100° C. below the maturing temperature of the specific vitreous bond used for a product. While both natural and synthetic organic materials may be used, natural materials are preferred since they generally are neither hazardous nor release hazardous fumes during their subsequent decomposition. Suitable preferred materials include such as nut shells, carbon, graphite, flower seeds, starch, sugar, wood particles, wood rosin and the like. Suitable materials which have hazardous decomposition products include polystyrene, polyethylene, polypropylene, acrylic polymers and the like. Also useful, but generally considered hazardous materials include naphthalene, p-dichlorobenzene and the like. Most preferably the material is crushed walnut shells because of a combination of availability, cost, and non-hazardous behavior during both handling and thermal decomposition. The sacrificial organic material will generally have a particle size which is about the same as or smaller than the size of the sol-gel aluminous grit used for a particular product. Suitable sizes range from about −75% to about +15%, preferably about −50% to about +5%, and most preferably about −35% to about −5% of the grit size. When the sacrificial organic material particles are too coarse they leave large holes in the finished product which has a non-uniform appearance and grinding performance. When they are too small they can retard makability of the product by causing non-bulking of the green mixture.

The final product will generally contain about 1 to 12 vol % porosity due to the inclusion of the sacrificial organic material in the mixture used to prepare the product. Preferably the amount of porosity is about 2 to 7 vol %. To accomplish this with the preferred walnut shells, about 1 to 5 wt % of the mix will be walnut shells, such as about 1.5 to 3 wt %.

The abrasive bodies may and often do include one or more second abrasives in amounts of about 1 to 80% by volume of the total abrasive content of the body. The second abrasive may act primarily as a filler if, for example, it is finer in grit size, or as an auxiliary or secondary abrasive, if it is the same or coarser. In some grinding applications the second abrasive will function as a diluent for the sol-gel aluminous abrasive grit. In other applications, the second abrasive may even enhance the overall grinding properties of the vitrified-bonded product, either in overall efficiency or in finish imparted to the material being ground. The second abrasive may be such as a fused alumina, silicon carbide, cubic boron nitride, flint, diamond, garnet, and the like. Preferably the second abrasive is a fused alumina.

The high porosity of the grinding products of this invention is provided by the combination of both the bubbled alumina and the sacrificial organic material which is burned out during firing to mature the vitreous bond. The total amount of porosity should generally be about 40 to 70 vol % of the total volume of the grinding product, preferably about 45 to 64 volume %.

For preferred grinding products, especially creepfeed wheels which are intended to remove a substantial portion of material in a single cut, rather than a small amount of material during each of a multiplicity of cuts, the total porosity is preferably about 55 to 65 vol %, with about 10 to 20 vol % being due to the bubbled alumina, about 2 to 7 vol % from the sacrificial organic material, and the balance being the natural or residual porosity of the product. When the total induced porosity is provided by bubbled alumina alone, the closed pores produced thereby result in a rapidly deteriorating dry grinding product and a very poor wet grinding product since, although a grinding fluid can enter these pores the chips of the ground material generally can not. When the total induced porosity is attempted to be provided by the sacrificial organic material, the resultant grinding product does not have sufficient physical strength to satisfactorily function.

After firing at conventional conditions determined primarily by the actual bond used, the vitrified bonded body may be impregnated in a conventional manner with a grinding aid, such as molten sulfur, or with a vehicle, such as epoxy resin, to carry a grinding aid into the pores thereof.

The abrasive bodies are suitable for grinding all types of metal such as various steels such as stainless steel, cast steel, hardened tool steel, cast irons, ductile iron, malleable iron, spheroidal graphite iron, chilled iron and modular iron, as well as metals like chromium, titanium, aluminum, and high strength alloys used in such as aerospace applications. As is the case with all abrasives and vitrified bonded bodies containing them, the abrasives and the bonded bodies of the invention will be more effective grinding some metals than others and will be more efficient in some grinding applications than in others.

A suitable process for preparing the grinding products entails the steps of (i) blending together the abrasive particles, vitreous bond composition, bubbled alumina, and sacrificial organic pore inducing material along with a total of about 1 to 8 wt % of one or more suitable binders, e.g. animal glue or a liquid sugar, to provide green strength, and often about 1 to 3 wt % water; (ii) screening the blend to remove and break up any agglomerates which have formed during the blending; (iii) molding at room temperature and under pressure the screened blend into a desired shape; and (iv) firing the molded shape at elevated temperature to mature the bond.

DESCRIPTION OF THE DRAWING

FIG. 1 is a graph showing the behavior of three vitreous bonded formulations upon heating. The graph traces the volume change with temperature and clearly shows the phenomenon of "slumping".

The wheels, called for convenience X, Y and Z, each contained the same bond material and the same abrasive component. The abrasive was 50% by volume of a sol-gel alumina abrasive and 50% by vol. of a fused alumina. Whenever the formulation contains bubbled alumina, the volume of the alumina shell is included in the volume of the fused alumina. The bond is the Bond A described elsewhere in this specification.

|  | Volume % | | |
| --- | --- | --- | --- |
|  | X | Y | Z |
| Bond | 6.4 | 6.4 | 6.4 |
| Abrasive | 36 | 36 | 36 |
| Pore Former |  |  |  |
| Bubble Alumina* | 19 | 13 | 0 |
| Walnut Shells | 0 | 6 | 13.7** |

*This is the internal volume of the alumina bubbles.
**Maximum amount possible with this vol % abrasive.

The formulations were made into wheels of the same dimensions and were subjected to the same heating schedules. The wheel containing only walnut shells began to shrink badly, expanded a little when the vitreous components melted and then shrank again. The formulation containing only bubble alumina remained reasonably dimensionally stable until shrinking a little in normal fashion at the bond forming temperatures. The formulation containing the mixture conformed reasonably well to the behavior of the wheel containing all bubble alumina.

In the following non-limiting examples, all parts and percents are by weight unless otherwise specified. Also, the term "abrasive grit" is used herein to refer to individual particles of the abrasive material.

EXAMPLE I

Sintered seeded sol-gel alumina abrasive grits were produced according to the teachings of commonly-owned U.S. Pat. No. 4,623,364. To produce grinding wheels in accordance with this invention, a mixture was made of 41.0 parts of an 80 grit sol-gel alumina particles having a nominal average particle size of 266 micron, 24.6 parts similarly size fused alumina particles, 9.9 parts a vitreous bond composition (Bond A), 16.4 parts bubbled alumina (0.4 mm in diameter from Herman C. Stark GmbH), 3.4 parts ground walnut shells (having an average particle size of 200 microns), 1.8 parts animal glue binder in water (Star Liquid Glue 900 from Olympic Adhesives Inc.), and 2.2 parts corn dextrin; blending the mixture in a Hobart-Style mixer for a total of about 40 minutes; screening the blended mixture to break up and remove agglomerates; molding the resultant mixture at room temperature with a hydraulic press to form wheels about 3" in diameter and 0.5" thick.

The wheels were air dried and then fired to 900° C. in air in 9 hours and then soaked at that temperature for 4 hours before being allowed to cool to room temperature. After firing, the wheels were quality checked for conformance to specifications.

The resultant final wheel contained 34 vol % total alumina, 5.7 vol % bond, and 60.3 vol % total porosity (which includes the porosity contributed by both the bubbled alumina and the walnut shells as well as the natural porosity of the wheel).

COMPARATIVE EXAMPLE A

The procedure of Example I was repeated to produce two similar grinding wheels for comparison purposes. The first, Wheel A, contained bubbled alumina but no ground walnut shells. The second, Wheel B, contained ground walnut shells but no bubbled alumina. The fired composition relative to volume % abrasive, bond, and porosity of the wheels was the same as that of Example I to produce a technically appropriate comparison to the wheel of Example I. The specific compositions used and the compositions of the finished wheels are provided in Table II below:

TABLE II

|  | Wheel A | Wheel B |
| --- | --- | --- |
| Compositions of Comparison Wheels, Vol % Ingredient | | |
| Sol-gel Alumina, 80 grit | 42.6 | 37.3 |
| Fused Alumina, 80 grit | 21.3 | 37.3 |
| Bubbled Alumina, 0.4 mm | 21.3 | |
| Walnut Shells, 200 micron | | 9.4 |
| Vitreous Bond, HA4C | 10.3 | 9.0 |
| Finished Wheel Composition, vol % | | |
| Abrasives | 25.5 | 34.0 |
| Bulk bubbled alumina | 26.4 | |
| Vitrified Bond | 5.7 | 5.7 |
| Total Porosity | 60.3 | 60.3 |

FIG. 1 shows the heating behavior (thermal expansion) of the three wheels and demonstrates the inability to make a good wheel when all of the added porosity is provided by walnut shells, i.e. as in Wheel B in the absence of the bubbled alumina. Also it demonstrates the makeability of a wheel from the mixture of bubbled alumina and walnut shells.

EXAMPLE II

To evaluate the grinding performance of the wheels produced in Example I vs. the wheels of Comparative Example A, the three wheels were evaluated by performing conventional grinding tests with the wheels at a wheel speed of 6267 rpm; work speed 30 rpm; using hardened Inconel steel; coolant trim rd3 78 at 1:20 ratio with city water.

The results of the grinding evaluation were:

EXAMPLE I

|  | | WHEEL A | WHEEL B |
| --- | --- | --- | --- |
| Metal removal rate in³/min, in | 0.121 | 0.099 | 0.107 |
| Power, HP/in | 2.8 | 2.6 | 2.4 |
| Grinding Ratio | 2.5 | 2.3 | 1.9 |

As demonstrated, the wheel of Example I (both bubbled alumina and walnut shells) took the highest power, but for that power produced the highest cut rate and gave the highest G ratio. Wheel B (no bubbled alumina) took the lowest power but produced the lowest G ratio and only obtained a medium cut rate. Wheel A (no walnut shells) took a higher power than Wheel A but produced the lowest cut rate and thus had a medium G ratio. Thus the wheels of the present invention are substantially superior to each of the comparative wheels which contained only one or the other of the bubbled alumina and the sacrificial organic material.

EXAMPLE III

The procedures of Examples I, II and Comparative Example A were repeated to produce additional wheels from similar abrasive mixtures utilizing a different vitreous bond (Bond B) and varying the source of the added porosity from Wheel C (solely walnut shells) to Wheel II (a mixture of mainly walnut shells and a small amount of bubbled alumina of the invention) to Wheel III (also a mixture of the invention). The wheels each contained a total of 36 vol % alumina abrasive of which 50% thereof was a sol-gel aluminous grit, 6.4 vol % vitreous bond, and 57.6 vol % total porosity. The finished wheel compositions were:

|  | Wheel C | Wheel II | Wheel III |
| --- | --- | --- | --- |
| Sol gel alumina, 80 grit | 18 | 18 | 18 |
| used alumina, 80 grit | 18 | 14.4 | 10.8 |
| Bulk bubbled alumina, 0.4 mm (32.2 vol % Al₂O₃, bal. porosity) | — | 11.2 | 22.3 |
| Walnut shells, 200 micron | 13 | 11.7 | 4.2 |
| Bond | 6.4 | 6.4 | 6.4 |

-continued

|  | Wheel C | Wheel II | Wheel III |
| --- | --- | --- | --- |
| Residual Porosity | 44.6 | 38.3 | 38.3 |
| Total Porosity | 57.6 | 57.6 | 57.6 |

The wheels were evaluated as in Example II for the internal grinding of Inconel 718 under the following conditions:

| | |
| --- | --- |
| Wet grinding: | 5%, Trim RD378 grinding fluid in water, flow of 6 gal./min., 19 psi pressure; |
| Rotary diamond trying: | 0.002 inches/rev lead 0.0005 inches compensation (depth) 6766 Diamond Roll @ 2.679 rpm |
| Wheel speed: | 6520 rpm (5124 ft/min) |
| Work speed: | 30 rpm (32 ft/min) |
| Wheel size: | 3 × 0.5 × 0.875 inches |
| Part size: | 7 × 0.25 × 4 inches |
| Grinding rate: | 0.00048 inches/sec on internal diameter of the part. |

The results of the grinding evaluations were:

|  | Wheel C | Wheel II | Wheel III |
| --- | --- | --- | --- |
| Metal removal rate, in³/min, in | 0.111 | 0.12 | 0.123 |
| Power, HP/in | 3.9 | 3.5 | 3.7 |
| G ratio | 3.1 | 3.6 | 3.9 |

As the results show, when bubbled alumina was added and the walnut shells were reduced simultaneously the metal removal rates and G ratios were improved and the power was reduced. No wheel containing bubbled alumina in the absence of walnut shells was evaluated in this comparison but if it had been it would have exhibited a G ratio below that of Wheels II and III.

EXAMPLE IV

The procedures of Examples I, II and Comparative Example A were repeated to produce additional wheels from similar abrasive mixtures utilizing the vitreous bond of Example I and varying the source of the added porosity from Wheel D (solely walnut shells) to Wheel IV (a mixture of mainly walnut shells and a small amount of bubbled alumina of the invention) to Wheel E (solely bubbled alumina). The wheels each contained a total of 40 vol % alumina abrasive of which 30% thereof was a sol-gel aluminous grit, 6.4 vol % vitreous bond, and 53.6 vol % total porosity. The finished wheel compositions were:

|  | Wheel D | Wheel IV | Wheel E |
| --- | --- | --- | --- |
| Sol gel alumina, 80 grit | 12 | 12 | 12 |
| Fused alumina, 80 grit | 28 | 25 | 23 |
| Bulk bubbled alumina, 0.4 mm (32.2 vol % Al₂O₃, bal. porosity) | — | 12 | 20 |
| Walnut shells, 200 micron | 9.6 | 6 | — |
| Bond | 6.4 | 6.4 | 6.4 |
| Residual Porosity | 44 | 38.6 | 38.6 |
| Total Porosity | 53.6 | 53.6 | 53.6 |

The wheels were evaluated for the dry traverse surface grinding of D3 hardened tool steel under the following conditions:

| | |
| --- | --- |
| Wheel speed: | (5,500 surface ft/min) 3000 rpm |
| Table speed: | (50 ft/min) |
| Wheel size: | 7 × 0.5 × 1.25 inches |
| Part size: | 7 × 0.2 × 4 inches |
| Unit downfeed: | 0.001 inch |
| Total downfeed | 0.020 inch |
| Crossfeed: | 0.050 inch/pass |

The results of three consecutive grinding runs with each wheel were:

|  | Metal Removal Rate, in³/min, in | G Ratio | Power Hp/in |
| --- | --- | --- | --- |
| Wheel D | 0.0237 | 6.6 | 0.95 |
|  | 0.0215 | 5.0 | 0.85 |
|  | 0.0187 | 3.7 | 0.69 |
| Wheel IV | 0.0265 | 8.9 | 1.18 |
|  | 0.0248 | 8.4 | 1.12 |
|  | 0.0254 | 8.3 | 1.18 |
| Wheel E | 0.0267 | 11.5 | 1.55 |
|  | 0.0267 | 8.4 | 1.33 |
|  | 0.244 | 6.8 | 1.16 |

As the results show, in dry grinding the use of the mixture of bubbled alumina and walnut shells (Wheel IV) produces a wheel with substantially increased life as there was little deterioration of its performance over the three consecutive runs. When only walnut shells were incorporated to increase porosity (Wheel D) the performance of the wheel was poor to begin with and then rapidly deteriorated. When only bubbled alumina is used (Wheel E), the performance of the wheel was initially very good but at an extremely high power cost. Thereafter, the wheel deteriorated in a similar manner and to an similar extent as Wheel D containing no bubbled alumina. The use of the combination of the walnut shells and bubbled alumina produced a wheel that did not deteriorate over the three dry grinding runs.

What is claimed is:

1. A bonded abrasive body prepared from a combination of (i) sol-gel sintered aluminous abrasive grit particles, (ii) a vitreous bond, (iii) from about 5 to about 30% of the volume of the combination, of bubbled alumina and (iv) from about 1 to about 12% by volume of the combination, of a sacrificial organic material which completely decomposes at a temperature at least 100° C. below the maturing temperature of the bond.

2. The bonded abrasive body of claim 1 wherein the sol-gel sintered aluminous abrasive grit particles are seeded sol-gel sintered aluminous abrasive grit particles.

3. The bonded abrasive body of claim 1 wherein the sol-gel sintered aluminous abrasive grit particles have a density of at least 95% of theoretical density.

4. The bonded abrasive body of claim 1 wherein the body consists essentially of about 25 to 50 volume % total abrasive, about 4 to 20 volume % bond, and about 40 to 70 volume % total porosity.

5. The bonded abrasive body of claim 1 wherein the body consists essentially of about 30 to 40 volume % total abrasive, about 5 to 15 volume % bond, and about 45 to 65 volume % total porosity.

6. The bonded abrasive body of claim 1 wherein the body further includes a second abrasive selected from the group consisting essentially of fused alumina, silicon carbide, cubic boron nitride, flint, diamond, garnet, and mixtures thereof in an amount of about 1 to 80 volume % of the total abrasive content of the body.

7. The bonded abrasive body of claim 1 wherein the vitreous bond includes up to about 30 volume % of a filler.

8. The bonded abrasive body of claim 7 wherein the filler is selected from the group consisting essentially of kyanite, mullite, nepheline syenite, molybdenum disulfide, and mixtures thereof.

9. The bonded abrasive body of claim 1 wherein the grit particles have an average particle size greater than about 65 microns.

10. The bonded abrasive body of claim 1 wherein the bubbled alumina is present in an amount of about 10 to 20 vol %.

11. The bonded abrasive body of claim 1 wherein the sacrificial organic material was present before firing in an amount of about 2 to 7 vol %.

12. The bonded abrasive body of claim 1 wherein the sacrificial organic material completely decomposes at a temperature which is at least about 50° C. below the maturing temperature of the specific vitreous bond.

13. The bonded abrasive body of claim 1 wherein the sacrificial organic material completely decomposes at a temperature which is at least about 100° C. below the maturing temperature of the specific vitreous bond.

14. The bonded abrasive body of claim 1 wherein the sacrificial organic material is selected from the group consisting essentially of walnut shells, flower seeds, wood particles, wood rosin, polyethylene, polypropylene, polystyrene, acrylic beads, sugar and starch beads.

15. The bonded abrasive body of claim 1 wherein the sacrificial organic material consists of crushed walnut shells.

16. The bonded abrasive body of claim 1 having a total porosity of the body is about 50 to 60 vol %, wherein about 5 to 20 vol % of the total porosity is due to the bubbled alumina, about 2 to 7 vol % is due to the sacrificial organic material, and the balance is the natural porosity of the body.

* * * * *